(12) United States Patent
Mildner et al.

(10) Patent No.: US 9,039,072 B2
(45) Date of Patent: May 26, 2015

(54) MOTOR VEHICLE BODY WITH WHEEL INSTALLATION STRUT

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/097,724

(22) Filed: Dec. 5, 2013

(65) Prior Publication Data

US 2014/0152052 A1 Jun. 5, 2014

(30) Foreign Application Priority Data

Dec. 5, 2012 (DE) .......................... 10 2012 023 784

(51) Int. Cl.
*B62D 25/00* (2006.01)
*B62D 25/08* (2006.01)

(52) U.S. Cl.
CPC .............. *B62D 25/00* (2013.01); *B62D 25/082* (2013.01); *B62D 25/088* (2013.01)

(58) Field of Classification Search
CPC ... B62D 25/00; B62D 25/0832; B62D 25/088
USPC ............ 296/187.09, 187.12, 193.05, 193.06, 296/193.09; 280/781, 785, 788; 180/89.1
See application file for complete search history.

(56) References Cited

U.S. PATENT DOCUMENTS

| | | | |
|---|---|---|---|
| 4,919,474 A * | 4/1990 | Adachi et al. ............ | 296/203.02 |
| 5,102,164 A | 4/1992 | Fujinaka et al. | |
| 6,170,906 B1 * | 1/2001 | Kasuga ................... | 296/203.02 |
| 7,147,275 B2 * | 12/2006 | Matsuyama et al. ..... | 296/203.02 |
| 7,210,733 B2 * | 5/2007 | Mouch et al. ............ | 296/203.02 |
| 7,766,420 B2 * | 8/2010 | Maruyama et al. ...... | 296/203.02 |
| 7,887,122 B2 | 2/2011 | Baccouche et al. | |
| 7,887,123 B2 | 2/2011 | Honji et al. | |
| 8,002,337 B2 | 8/2011 | Baccouche et al. | |

FOREIGN PATENT DOCUMENTS

DE 4329050 A1 3/1995
DE 102007060868 A1 6/2009
(Continued)

OTHER PUBLICATIONS

German Patent Office, German Patent Search Report for Application No. 102012023784.7, dated Aug. 13, 2013.
(Continued)

*Primary Examiner* — Lori L Lyjak
(74) *Attorney, Agent, or Firm* — Ingrassia Fisher & Lorenz PC

(57) ABSTRACT

A motor vehicle body is provided with a lateral front wall and a wheel installation strut connected therewith with an inner component and an outer component with an outer side wall. The outer component includes, but is not limited to a front portion with a lower front connecting flange, which is connected to the inner component and forms an angle with the horizontal which amounts to a maximum of approximately 20°, and a rear portion with a lower rear connecting flange, which is connected to the lateral front wall and forms an angle with the vertical which amounts to a maximum of approximately 20°.

11 Claims, 8 Drawing Sheets

(56) References Cited

FOREIGN PATENT DOCUMENTS

| | | |
|---|---|---|
| DE | 102010027916 A1 | 11/2010 |
| DE | 102009042064 A1 | 3/2011 |
| DE | 102009058127 A1 | 6/2011 |
| DE | 102010034939 A1 | 2/2012 |
| EP | 2615011 A1 | 7/2013 |
| GB | 2490018 A | 10/2012 |
| JP | 2009029202 A | 2/2009 |

OTHER PUBLICATIONS

Search Report issued in GB1321518.1 completed Jun. 11, 2014.

* cited by examiner

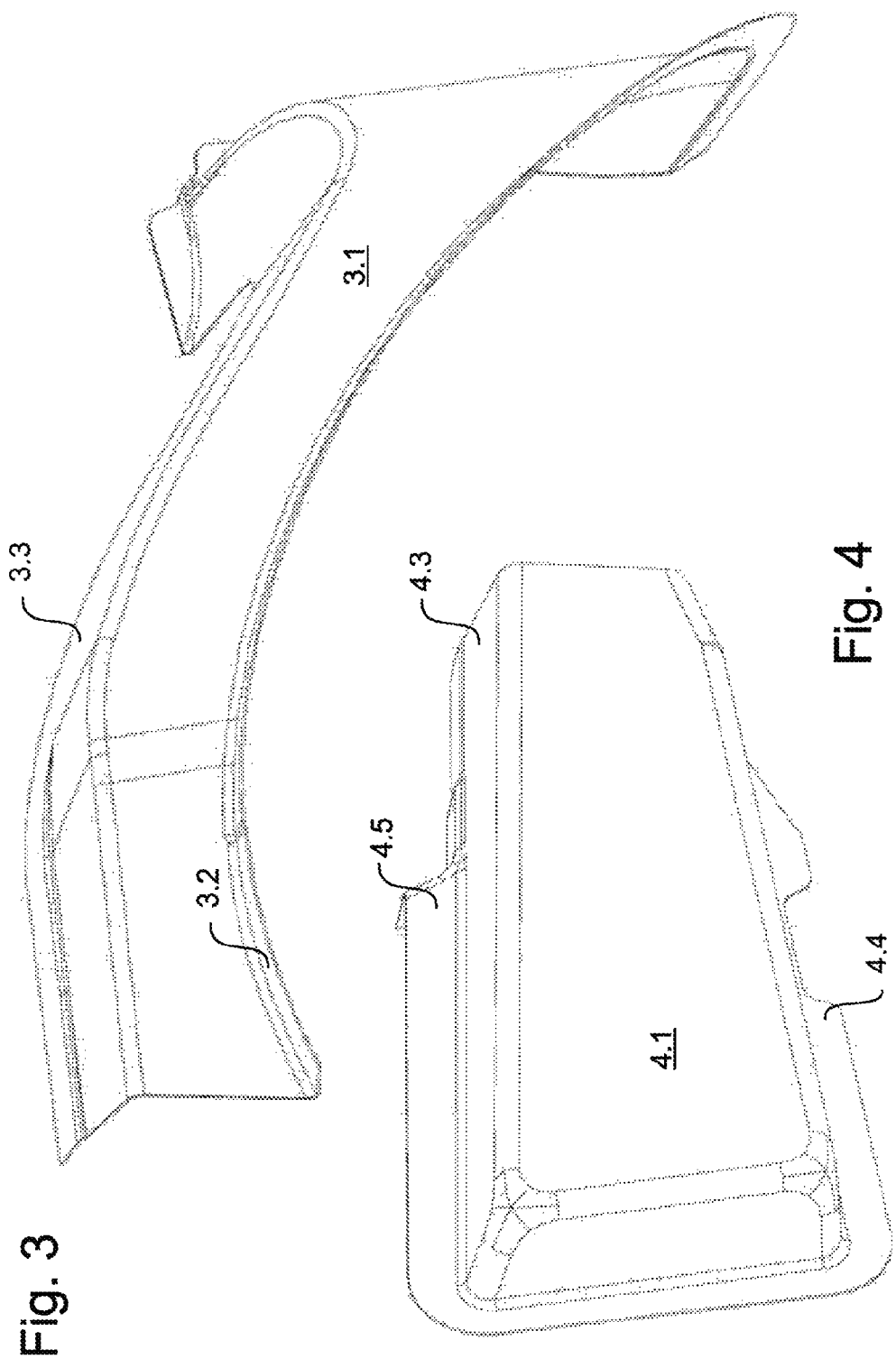

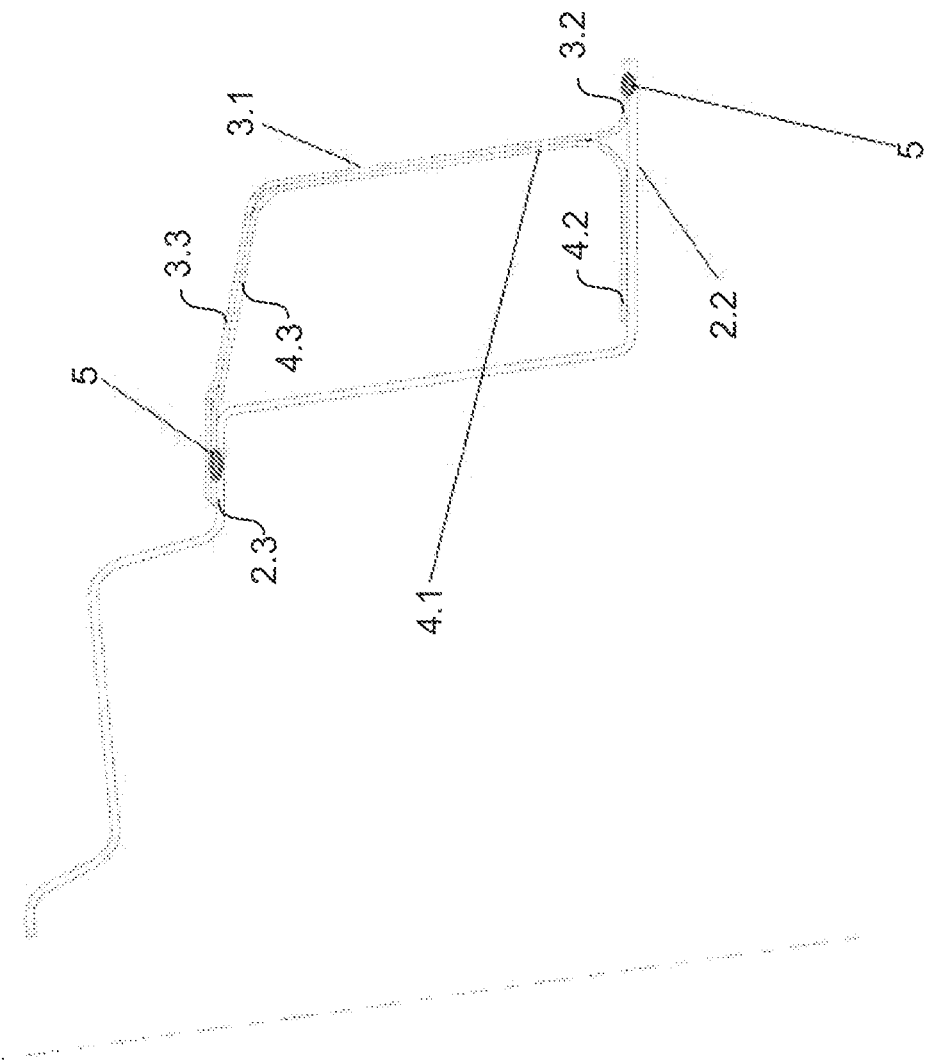
Fig. 8
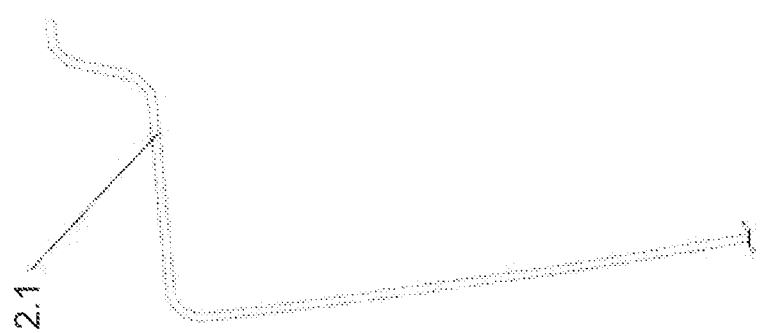

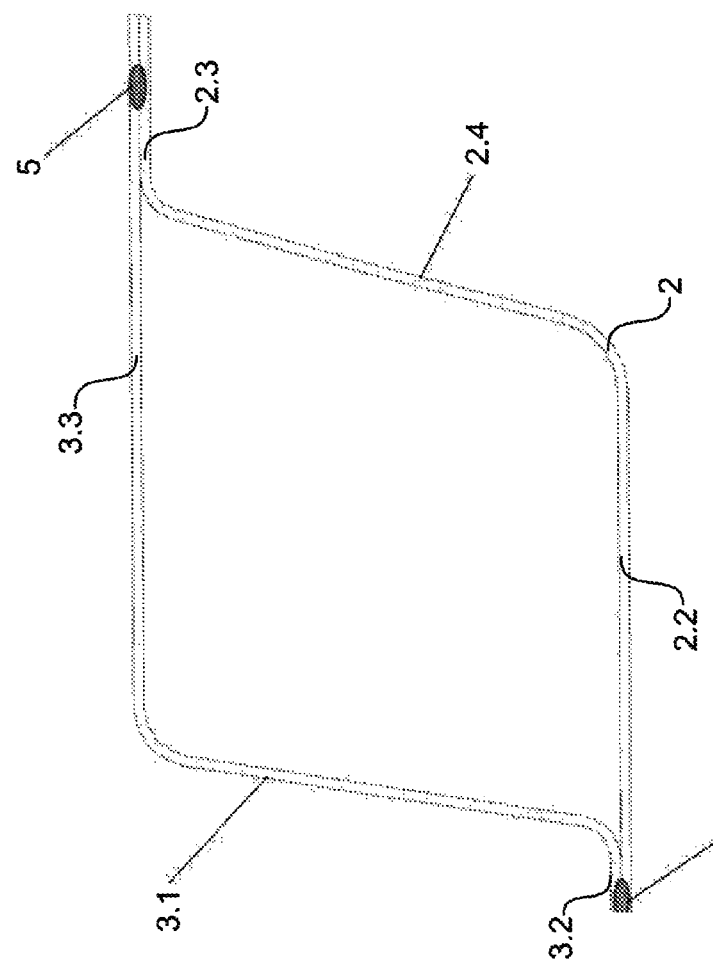
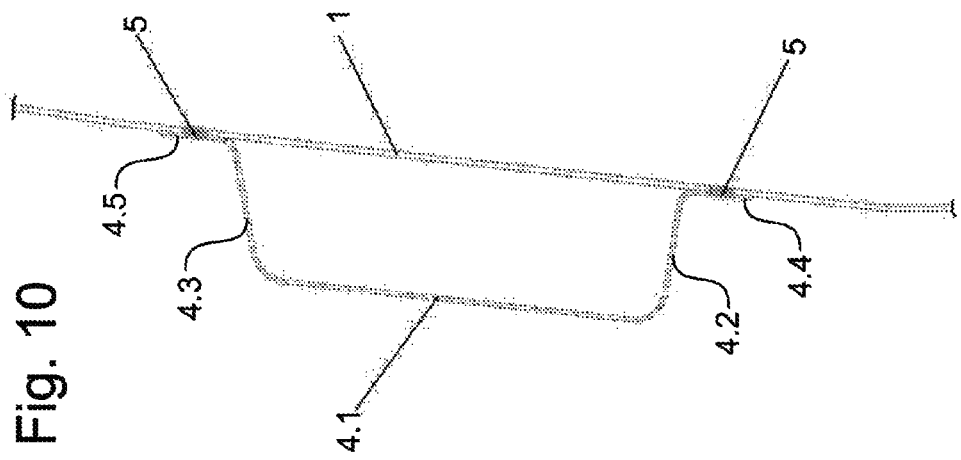

MOTOR VEHICLE BODY WITH WHEEL INSTALLATION STRUT

CROSS-REFERENCE TO RELATED APPLICATION

This application claims priority to German Patent Application No. 10 2012 023 784.7, filed Dec. 5, 2012, which is incorporated herein by reference in its entirety.

TECHNICAL FIELD

The technical field relates to a motor vehicle body, in particular a passenger car body, with a lateral front wall and a wheel installation strut connected to the latter and a method for producing such a motor vehicle body.

BACKGROUND

From DE 43 29 050 C2 a body in white with a wheel installation strut is known, which is welded to a lateral front wall with vertically offset welding faces. Vertically offset welding faces enlarge the vertical overall height of the wheel installation strut. On the other hand, the vertical overall height that is available in the front region of the wheel installation strut is limited, in particular because of a jounce of the front wheels and/or of a predetermined pedestrian protection deformation travel of the hood.

In view of the foregoing, at least one object is to provide an improved motor vehicle body. In addition, other objects, desirable features, and characteristics will become apparent from the subsequent summary and detailed description, and the appended claims, taken in conjunction with the accompanying drawings and this background.

SUMMARY

A motor vehicle body according to an embodiment comprises a lateral front wall or a front wall side part. This can have an L-shaped cross section where an upper leg forms a support of a windshield. The lateral front wall can in particular form a part of an A-pillar of the body.

A wheel installation strut is connected to the lateral front wall, which strut comprises an inner component and an outer component connected therewith, which in an embodiment form a box-shaped cross-sectional profile of the wheel installation strut. The outer component comprises an outer side wall, which in an embodiment forms an angle with the vertical, which amounts to a maximum of approximately 20°, in particular to a maximum of approximately 10°. References to the vertical or perpendicular or gravitational direction and the horizontal or normal to the gravitational direction relate in particular to a design position of the body, in which its transverse axis is parallel to the horizontal and its vertical axis parallel to the vertical. Thus, an outer side wall which forms an angle with the vertical that amounts to a maximum of approximately 20°, in particular to a maximum of approximately 10°, is substantially vertical. Angle details relate in particular to the amount of the angle. Thus, an outer side wall, which forms an angle $\alpha$ with the vertical, can be inclined against the vertical by $\pm\alpha$.

According to an embodiment, the outer component comprises a front portion with a lower front connecting flange, which is connected to the inner component and forms an angle with the horizontal that amounts to a maximum of approximately 20°, in particular to at least substantially approximately 0°, and a rear portion with a lower rear connecting flange, which is connected to the lateral front wall and forms an angle with the vertical, which amounts to a maximum of approximately 20°, in particular at least substantially approximately 0°.

In an embodiment, the outer component thus comprises a front portion with a lower front connecting flange which, at least substantially, is offset horizontally from the outer side wall or forms an angle with the horizontal that amounts to a maximum of approximately 20°, and a rear portion with a lower rear connecting flange which, at least substantially, is oriented vertically or forms an angle with the vertical which amounts to a maximum of approximately 20°, and which is connected to the lateral front wall.

The location detail "front" and "rear" relate in particular to the forward travelling direction, so that a front portion or a front component in particular can be arranged nearer to a front of the body than a rear portion or a rear component. Accordingly, location details "inner" and "outer" in particular relates to a direction from the vehicle interior to the outside, so that an outer component in particular can be nearer to an outside of the body than an inner component.

Through the vertical rear connecting flange, the outer component can be connected in its rear portion to the lateral front wall in an optimal manner. Additionally or alternatively, the vertical height of the wheel installation strut in the front portion can be reduced through the horizontal front connecting flange and thus in particular a larger jounce travel of the front wheels and/or a larger pedestrian protection deformation travel be combined with a wheel installation strut cross-sectional profile with a high geometrical moment of inertia.

In an embodiment, the front portion of the outer component comprises at least one front outer component, which in turn comprises the lower front connecting flange. Additionally or alternatively, the rear portion of the outer component comprises at least one rear outer component, which in turn comprises the lower rear connecting flange and is connected to this front outer component. Through this two or multiple-part design, the production and/or assembly of the outer component in particular can be improved.

In an embodiment, the rear outer component is connected to the front outer component in an overlap portion. Front and rear outer component can comprise at least substantially complementary contours in the overlap portion. In an embodiment, the overlap portion in vehicle or wheel installation strut longitudinal direction is at least approximately 15 mm, in particular at least 30 mm and/or a maximum of 40 mm, in particular a maximum of approximately 25 mm long. This optimally combines weight and strength requirements. In an embodiment, the overlap portion comprises one or two rows of spot welds with which the front and rear outer component are connected to one another.

In an embodiment, the front portion of the outer component, in particular the front outer component, comprises an upper front connecting flange, which is connected to the inner component, forms an angle with the horizontal that amounts to a maximum of approximately 20°, and which is offset from the outer side wall in the opposite direction to the lower front connecting flange or to the side located opposite. In an embodiment, the front portion, in particular the front outer component thus comprises a Z-shaped cross section with the side wall and the two front connecting flanges horizontally projecting from said side wall in the opposite direction or towards sides which are located opposite.

In an embodiment, the inner component comprises a lower connecting flange, which is connected to the lower front connecting flange of the outer component, and an upper connecting flange which is offset in an opposite direction, which is connected to the upper front connecting flange of the outer component and forms an angle with the horizontal which amounts to a maximum of approximately 20°. In an embodiment, the inner component thus also comprises at least in a front portion a Z-shaped cross section with the side wall and the two connecting flanges horizontally projecting from the said side wall in opposite direction. By connecting the upper and/or lower connecting flanges or the Z-shaped front portions of the inner and outer component, in particular of the outer front component, a wheel installation strut with box-like profile and connecting flanges horizontally projecting in opposite direction is formed in an embodiment.

In an embodiment, the rear outer component comprises a lower flank, which is offset from the outer side wall and connected to the front lower connecting flange of the front outer component. Additionally or alternatively, the rear outer component can comprise an upper flank which, is offset from the outer side wall in particular in the same direction or towards the same side and is connected to the front upper connecting flange of the front outer component. In an embodiment, the rear outer component thus comprises a C-shaped cross section with the side wall and the two flanks which horizontally project from said side wall in the same direction or towards the same side. In this way, the box-like profile of the wheel installation strut can also be formed together with the lateral front wall in the rear portion or through the rear outer component. Additionally or alternatively to the connection of the upper and/or lower flank to the upper or lower connecting flange of the front outer component, the side walls of the front and rear outer component can be connected to one another in the overlap portion.

These flanks in turn can be followed by vertical connecting flanges of the rear outer component. Generally, the rear portion of the outer component in an embodiment comprises an upper and/or a lower flank, which is offset from the outer side wall, and from which in turn a rear upper or lower vertical connecting flange of the outer component is offset in opposite direction. In an embodiment, the rear portion of the outer component comprises an upper rear connecting flange, which is connected to the lateral front wall and forms an angle with the vertical which amounts to a maximum of approximately 20°.

The upper and/or lower vertical connecting flange in an embodiment extends only over a part of the length of the rear outer component. In this way, an optimal connection to the lateral front wall through the vertical connecting flange or connecting flanges can be combined with an optimal connection to the front outer component in the overlap portion.

In an embodiment, the inner component comprises a spring strut mounting. In an embodiment, this can be formed as a casting and/or be connected to a front inner component, in order to form the inner component together.

In an embodiment, two or more of the components explained above can be connected to one another in a materially joined and/or frictionally joined manner, in particular the outer to the inner component, the front and rear outer component, the wheel installation strut to the lateral front wall and/or the spring strut mounting to the front inner component. In an embodiment, this can optimize weight, strength and/or production. Two or more of the components explained above can be welded together in particular, in particular by means of CO2-welding and/or spot welding. Additionally or alternatively, two or more of the components explained above can be in particular glued, riveted, caulked and/or screwed to one another.

In an embodiment, one or a plurality of the components explained above can be produced by deep drawing. In an embodiment, this can optimize weight, strength and/or production.

In an embodiment, a hinge pillar is connected to the rear portion of the outer component in order to, at least partially, form an A-pillar of the motor vehicle.

According to an embodiment, the outer and the inner component are connected to one another and to the lateral front wall. In particular, the front and rear outer component can be connected to one another. In advance, at the same time or thereafter, the front outer component can be connected to the inner component. In advance, at the same time or thereafter, the rear outer component can be connected to the lateral front wall, the inner component and/or the hinge pillar.

BRIEF DESCRIPTION OF THE DRAWINGS

The present invention will hereinafter be described in conjunction with the following drawing figures, wherein like numerals denote like elements, and:

FIG. 3 is a front outer component of the outer component of FIG. 5;

FIG. 4 is a rear outer component of the outer component of FIG. 5;

FIG. 8 is a section along the line VIII-VIII in FIG. 1;
FIG. 9 is a section along the line IX-IX in FIG. 1;
FIG. 10 is a section along the line X-X in FIG. 1;
and
FIG. 11 is a section along the line XI-XI in FIG. 1.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
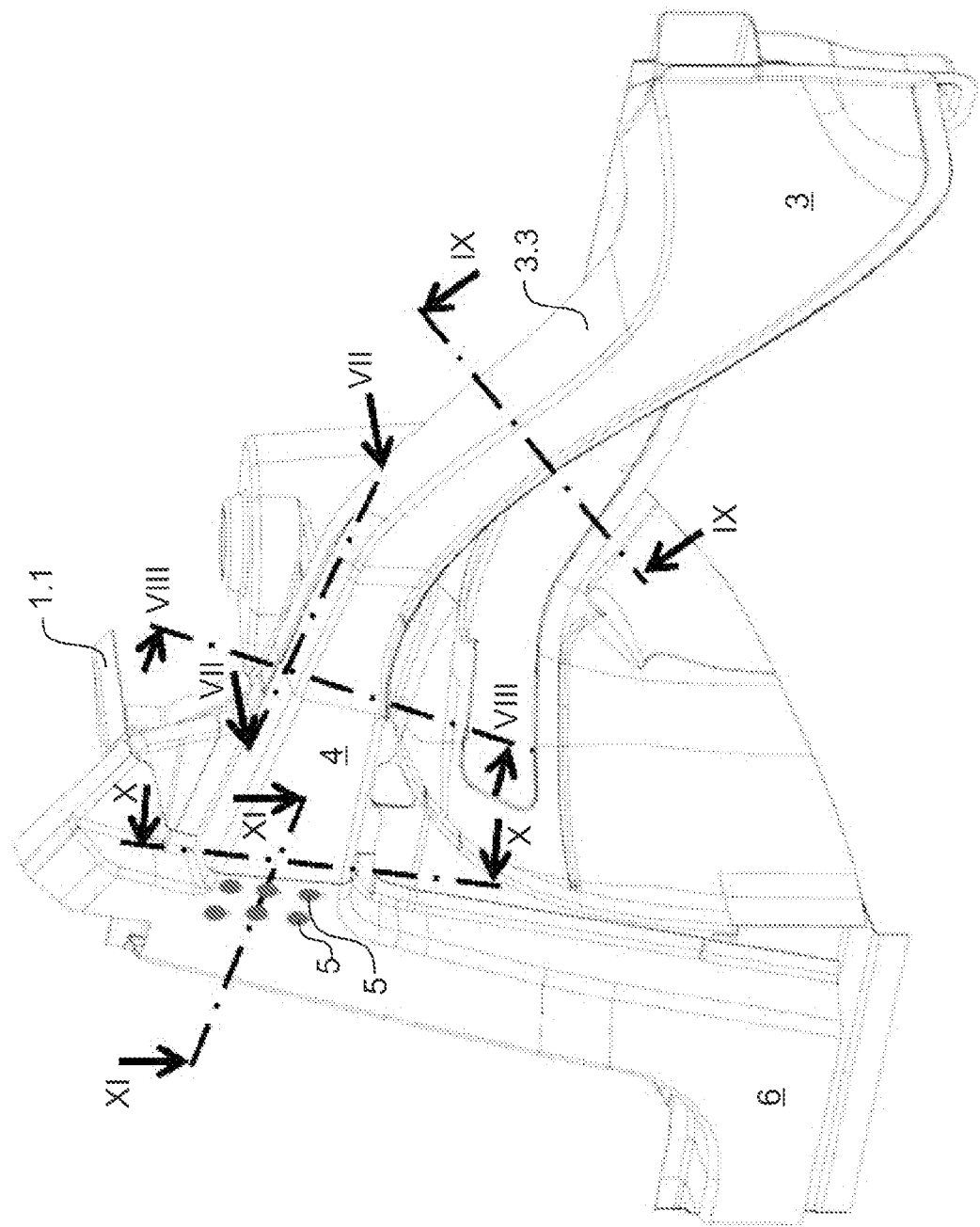
FIG. 1 is a part of a motor vehicle body according to an embodiment in a perspective view.
Figure 2:
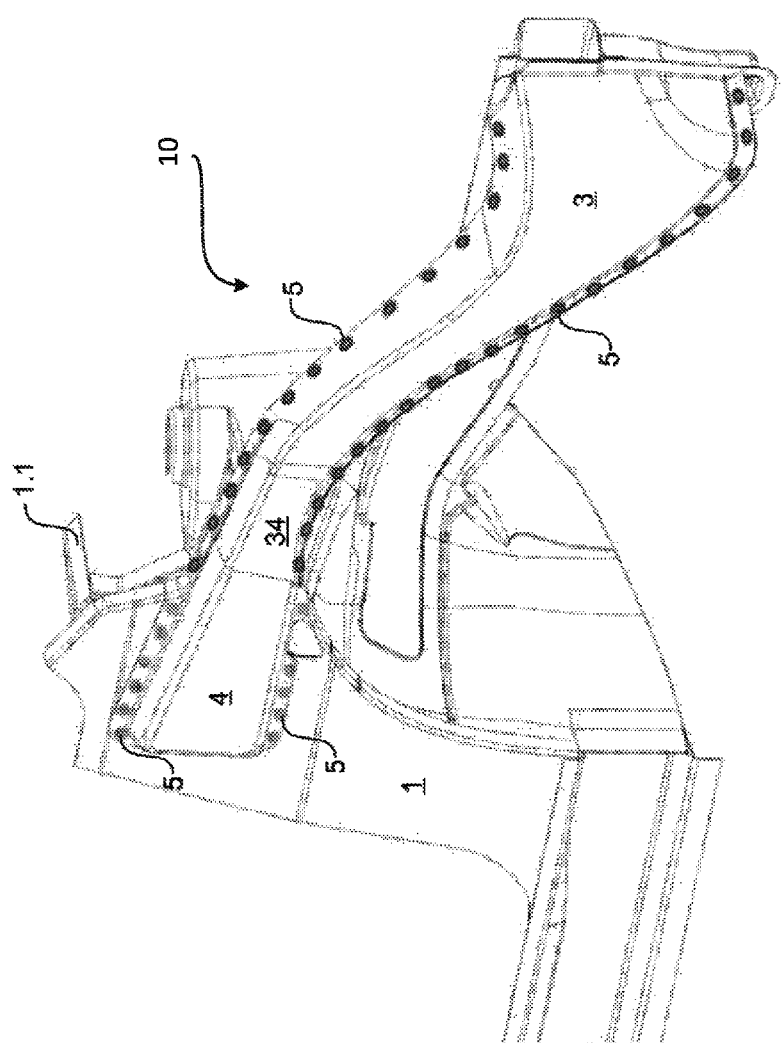
FIG. 2 is the motor vehicle body of FIG. 1 without hinge pillar.

FIG. 1 and FIG. 2 show a part of a motor vehicle body according to an embodiment in a perspective view from the front. The motor vehicle body comprises a lateral front wall 1 with an L-shaped cross section. An upper leg 1.1 forms a support of a windshield (not shown).

Figure 5:
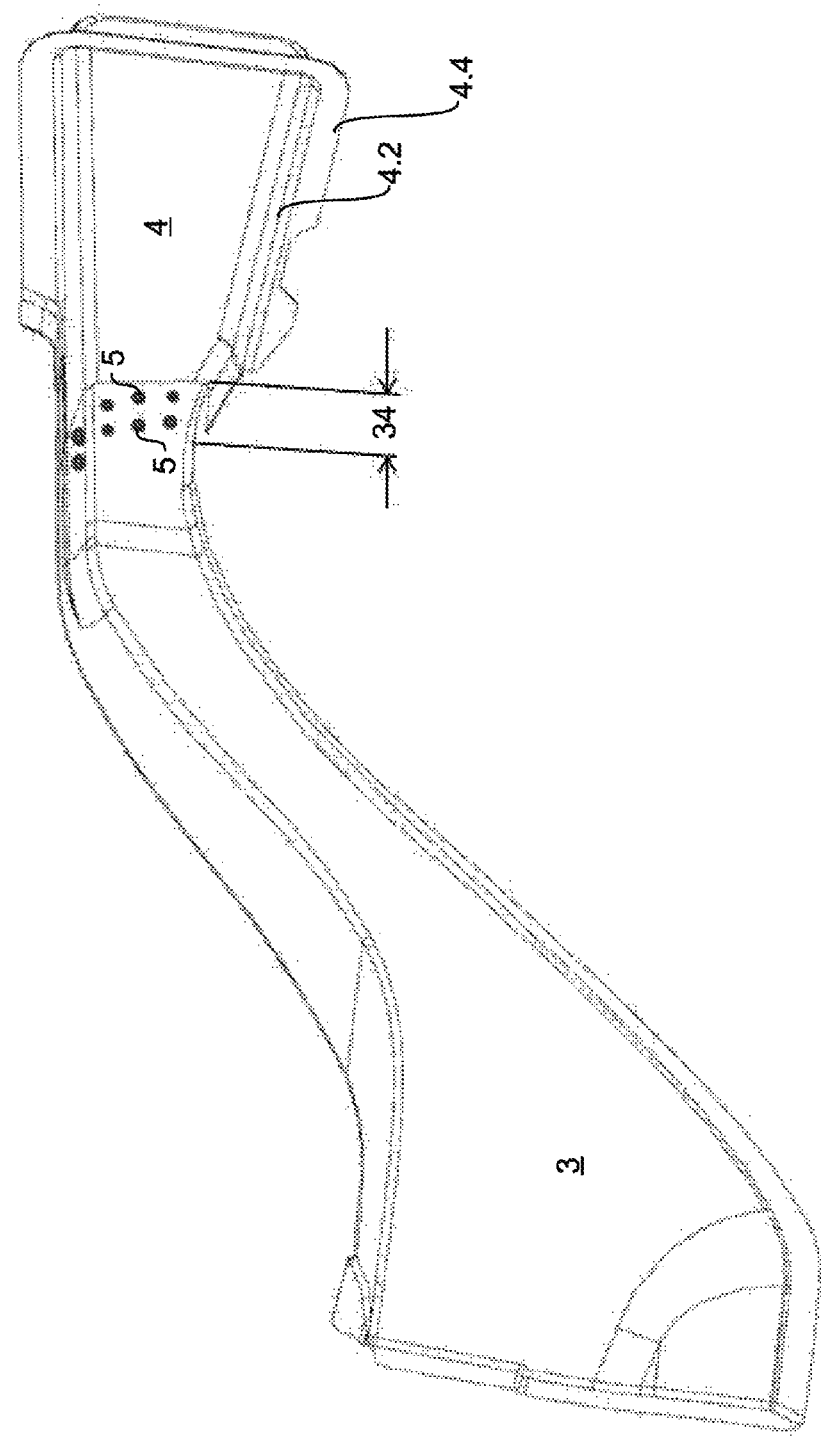
FIG. 5 is an outer component of a wheel installation strut of the motor vehicle body of FIG. 1 and FIG. 2.
Figure 6:
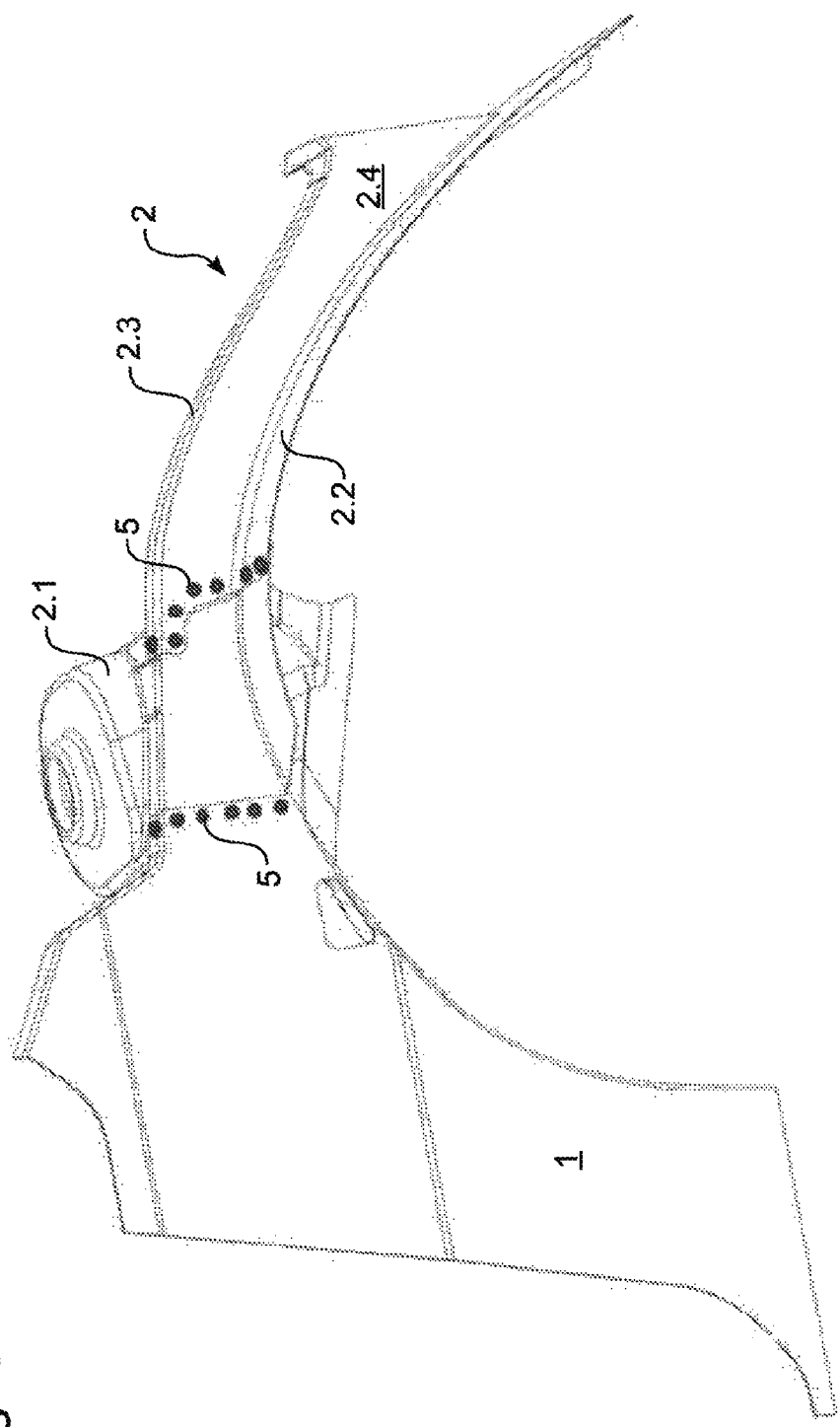
FIG. 6 is a lateral front wall and an inner component of the wheel installation strut of the motor vehicle body of FIG. 1 and FIG. 2 connected therewith.
Figure 7:
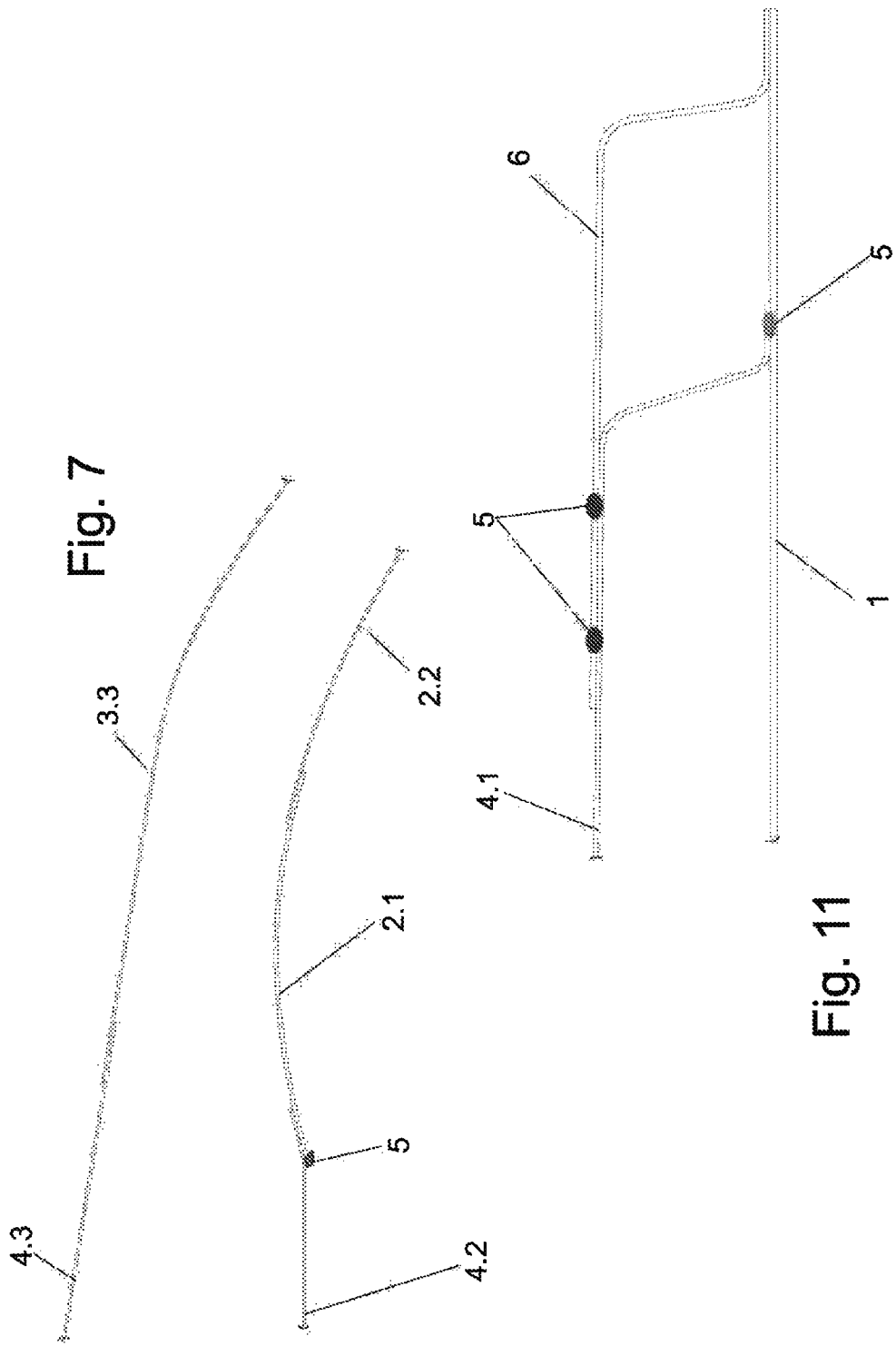
FIG. 7 is a section along the line VII-VII in FIG. 1.

A wheel installation strut shown generally at 10 is connected to the lateral front wall, which strut comprises an inner component 2 (see in particular FIG. 6) and an outer component (see in particular FIG. 5) connected therewith in an overlap portion 34 with a front outer component 3 (see in particular FIG. 3) and a rear component 4 (see in particular FIG. 4). The outer component or its front outer component 3 and its rear outer component 4 each comprise an outer side wall 3.1 and 4.1 respectively, which in the exemplary embodiment form an angle with the vertical, which exemplarily amounts to approximately 0°.

The front outer component 3 forms a part of a front portion of the outer component and comprises a lower front connecting flange 3.2 and an upper front connecting flange 3.3 offset in opposite direction, which is welded to a lower or offset-inopposite-direction upper connecting flange 2.2 and 2.3 respectively of the inner component 2 directly or via a flank 4.5 of the rear outer component 4 and with the horizontal form an angle between approximately 0° (see in particular section IX-IX of FIG. 9) and approximately 10° in the overlap portion (see in particular section VIII-VIII of FIG. 8).

Tensile element rear outer component 4 in particular forms a rear portion of the outer component with a lower rear connecting flange 4.4 and an upper rear connecting flange 4.5, which are welded to the lateral front wall 1 and with the vertical form an angle of approximately 0° (see in particular section X-X of FIG. 10).

Through these vertical rear connecting flanges 4.4, 4.5 the outer component in its rear portion can be optimally connected to the lateral front wall 1. Through the horizontal front connecting flanges 3.2, 3.3, the vertical height of the wheel installation strut in the front portion can be reduced and thus in particular a larger jounce travel of the front wheels and/or a larger pedestrian protection deformation travel be combined with a wheel installation strut cross-sectional profile with a high geometrical moment of inertia.

The rear outer component 4 in the overlap portion 34 is connected to the front outer component 3. To this end, the front and rear outer component 3, 4 have complementary contours in the overlap portion 34. In particular, the rear outer component 4 comprises a lower flank 4.2, which is offset from its outer side wall 4.1 and connected to the front lower connecting flange 3.2 of the front outer component 3 and forms an angle with the horizontal at approximately 0°. Additionally, the rear outer component 4 comprises an upper flank 4.3, which is offset from its outer side wall 4.1 in the same direction and connected to the front upper connecting flange 3.3 of the front outer component 3 and forms an angle with a horizontal of approximately 10°, in order to improve a deep drawing. These flanks 4.3, 4.4 in turn are followed by the vertical connecting flanges 4.4, 4.5 of the rear outer component 4. The upper and lower vertical connecting flange 4.3, 4.4 only extends over a part of the length of the rear outer component 4.

The overlap portion 34 in vehicle or wheel installation strut longitudinal direction is approximately 20 mm or approximately 35 mm long in order to accommodate one or two rows of spot welds or rivets. In the figures, components are connected through spot welds or rivets, which for the more compact representation are uniformly represented and marked with the reference number 5.

The inner component 2 comprises a lower connecting flange 2.2, which is connected to the lower front connecting flange 3.2 of the front outer component 3, and an upper connecting flange 2.3 offset in opposite direction, which is connected to the upper front connecting flange 3.3 of the outer component 3 (see in particular section VIII-VIII, IX-IX of FIG. 8, FIG. 9) in order to form a wheel installation strut with a box-like profile and connecting flanges horizontally projecting in opposite direction in the front portion.

The inner component 2 comprises a spring strut mounting 2.1, which in the exemplary embodiment is formed as a casting and is connected to a front inner component 2.4, in order to form the inner component 2 together. The front and rear outer component 3, 4 are connected in the overlap portion 34 through spot welds or rivets 5, in particular by connecting flange 3.2 and flank 4.2, connecting flange 3.3 and flank 4.3 and/or side wall 3.1 and 4.1. In advance, at the same time or thereafter, the front outer component 3 and the inner component 2 are connected through spot welds or rivets 5, in particular by connecting flange 3.2 and 2.2 and/or connecting flange 3.3 and 2.3. In advance, at the same time or thereafter, the rear outer component 4 and the inner component 2 are connected through spot welds or rivets 5, in particular by connecting flank 4.2 and connecting flange 2.2 and/or flank 4.3 and connecting flange 2.3. In advance, at the same time or thereafter, the rear outer component 4 and the lateral front wall 1 are connected through spot welds or rivets 5, in particular through connecting flange 4.4 and/or 4.5. In advance, at the same time or thereafter, the spring strut mounting 2.1 and/or a hinge pillar 6 is/are connected through spot welds or rivets 5. One or a plurality of the components explained above, in particular the rear outer component 4, can be produced with the drawing.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle body, comprising:
   a lateral front wall; and
   a wheel installation strut comprising:
   an inner component and an outer component,
   wherein the outer component comprises a front portion and a rear portion that overlap at an overlapping section and that are connected through a flank, the front portion comprises a lower front connecting flange and an upper front connecting flange that are connected to the inner component, and
   wherein the rear portion comprises a lower rear connecting flange and an upper rear connecting flange that are connected to the lateral front wall.

2. The motor vehicle body according to claim 1,
   wherein the front portion of the outer component comprises a front outer component that comprises the lower front connecting flange, and
   wherein the rear portion of the outer component comprises a rear outer component that comprises the lower rear connecting flange and is connected to the front outer component.

3. The motor vehicle body according to claim 2, wherein the flank is offset from an outer side wall and connected to a at least one of the lower front connecting flange and the upper front connecting flange of the front outer component.

4. The motor vehicle body according to claim 1, wherein the upper front connecting flange is connected to the inner component and forms an angle with the horizontal that amounts to a maximum of approximately 20° and is offset from the outer side wall in a direction opposite to the lower front connecting flange.

5. The motor vehicle body according to the claim 1, wherein the inner component comprises a lower connecting flange that is connected to the lower front connecting flange of the outer component and an upper connecting flange offset in opposite direction that is connected to the upper front connecting flange of the outer component.

6. The motor vehicle body according to claim 1, wherein the upper rear connecting flange is connected to the lateral front wall and forms an angle with the vertical that amounts to a maximum of approximately 20°.

7. The motor vehicle body according to claim 1, wherein the rear portion of the outer component comprises a flank that is offset from an outer side wall, and from which in turn the rear connecting flange of the outer component is offset in an opposite direction.

8. The motor vehicle body according to claim 1, wherein the inner component comprises a spring strut mounting.

9. The motor vehicle body according to claim 1, wherein at least a first component is connect to a second component in a materially joined manner.

10. The motor vehicle body according to claim 1, wherein at least one of the outer component, and the inner component is produced by deep drawing.

11. The motor vehicle body according to claim 1, further comprising a hinge pillar that is connected to the rear portion of the outer component.

* * * * *